Aug. 5, 1924.  
H. A. FRASER ET AL  
1,503,944  
MACHINE FOR MANUFACTURING COILED WIRE FABRIC  
Original Filed Aug. 27, 1921    4 Sheets-Sheet 1
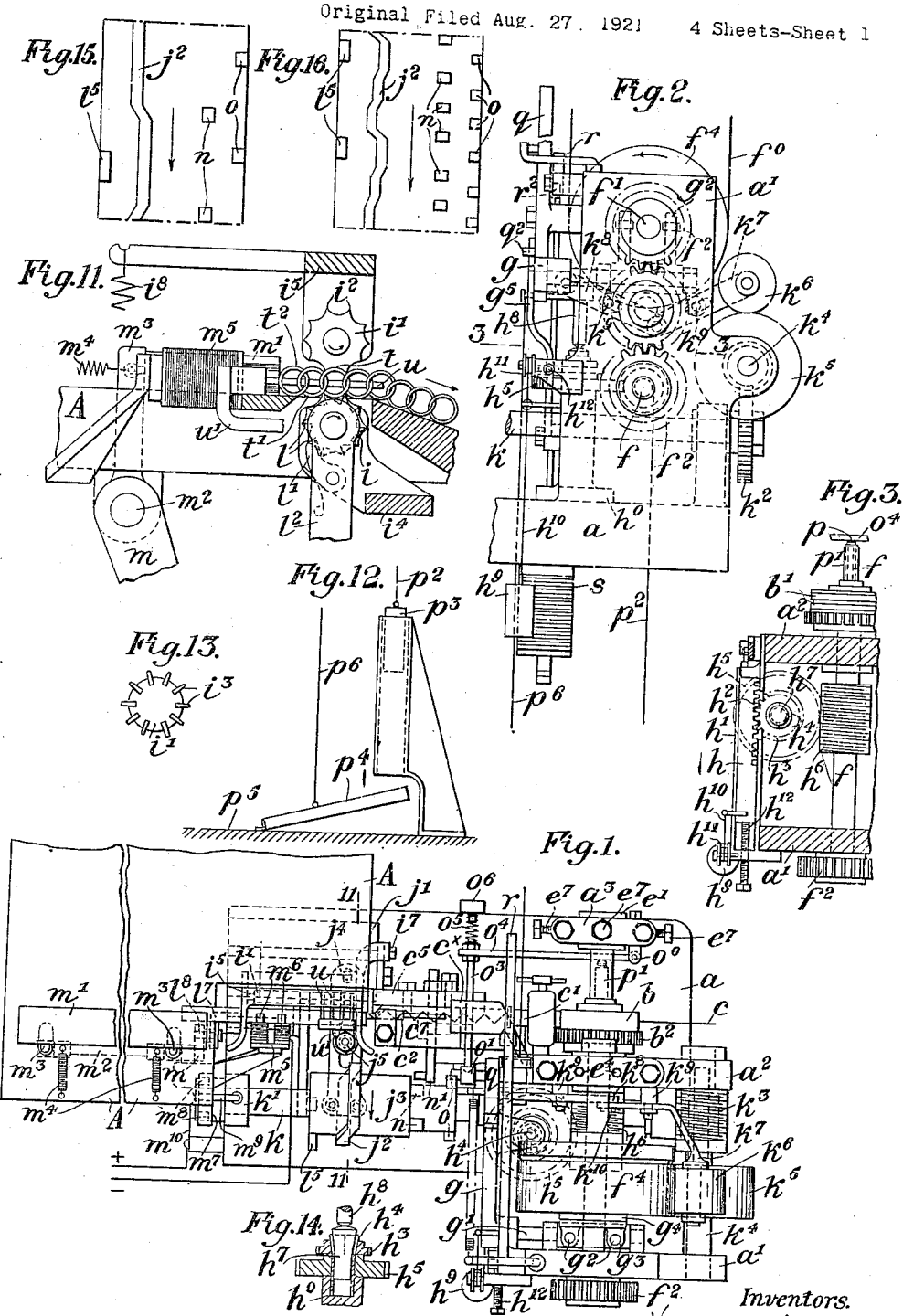

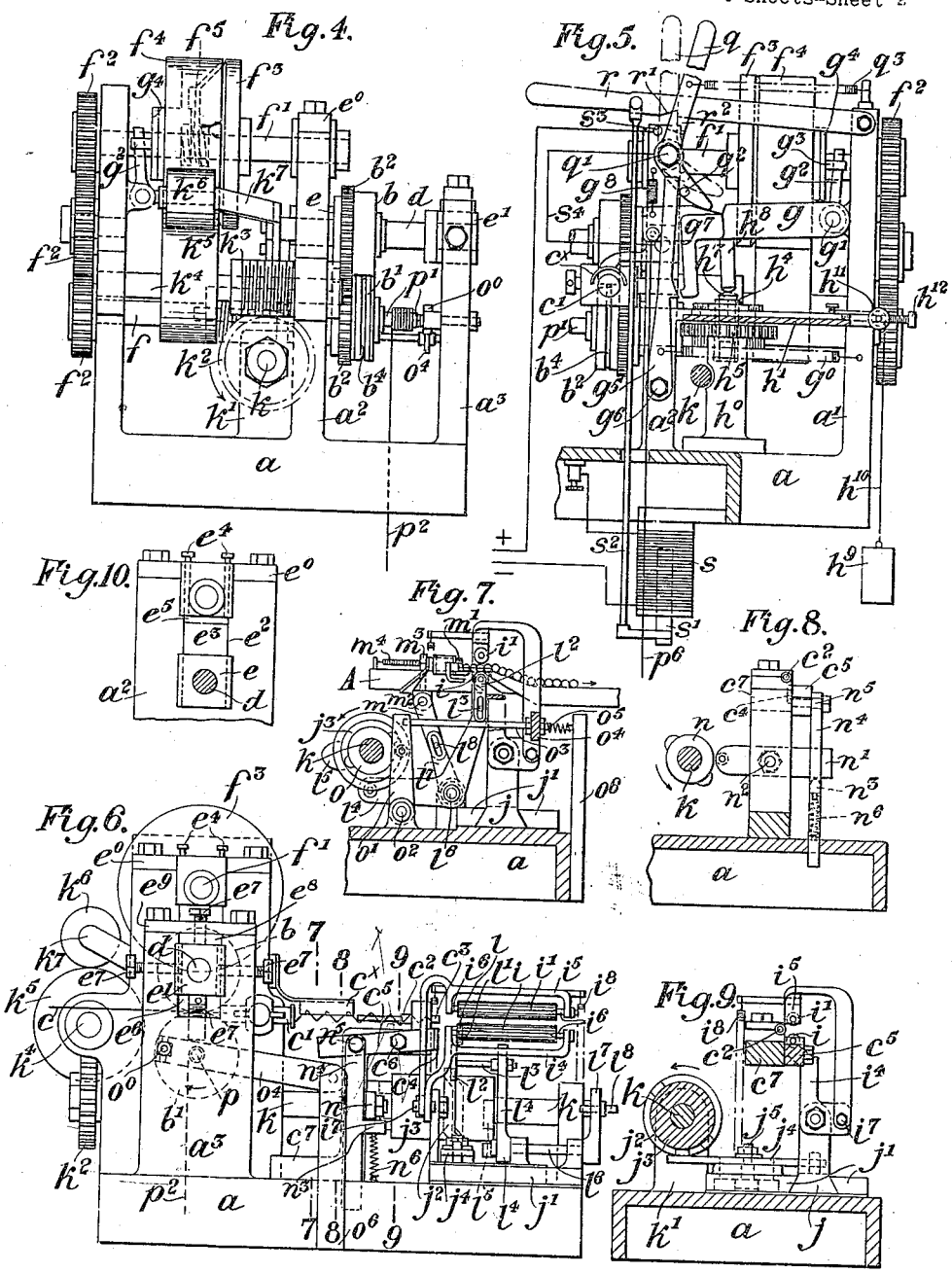

Aug. 5, 1924.
H. A. FRASER ET AL
1,503,944
MACHINE FOR MANUFACTURING COILED WIRE FABRIC
Original Filed Aug. 27, 1921  4 Sheets-Sheet 3
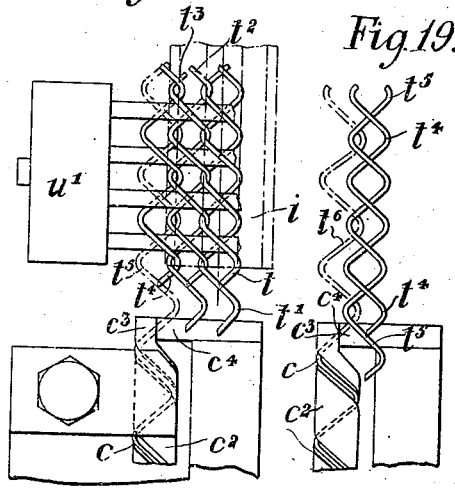
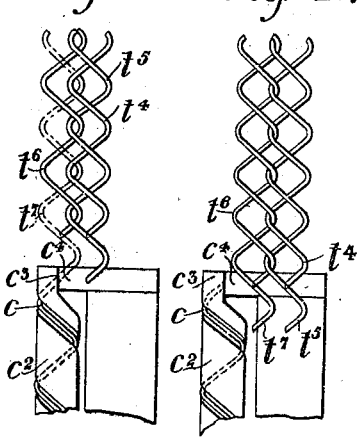
Fig.17.  Fig.19.  Fig.20.  Fig.21.
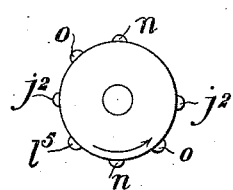
Fig.23.
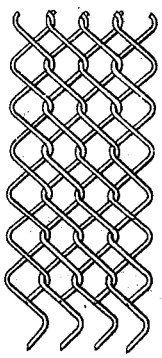
Fig.22.
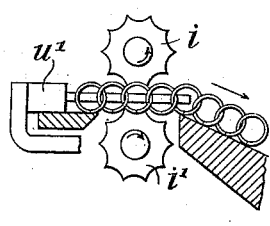
Fig.18.
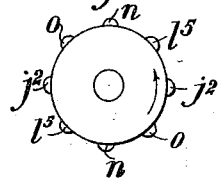
Fig.24.
Inventors
Henry A. Fraser
and Peter H. Leighton
By George A. Pruont, atty Aug. 5, 1924.

H. A. FRASER ET AL 1,503,944

MACHINE FOR MANUFACTURING COILED WIRE FABRIC

Original Filed Aug. 27, 1921  4 Sheets-Sheet 4

Inventors
Henry A. Fraser
and Peter F. Creighton
By George A. Prevost, atty.

Patented Aug. 5, 1924.

1,503,944

UNITED STATES PATENT OFFICE.

HENRY ARTHUR FRASER AND PETER FREDERICK CRIGHTON, OF LONDON, ENGLAND.

MACHINE FOR MANUFACTURING COILED-WIRE FABRIC.

Original application filed August 27, 1921, Serial No. 495,986. Patent No. 1,431,645, dated October 10, 1922. Divided and this application filed July 1, 1922. Serial No. 572,346.

*To all whom it may concern:*

Be it known that we, HENRY ARTHUR FRASER and PETER FREDERICK CRIGHTON, subjects of the King of Great Britain, residing at 13 Wharf Road, London, England, have invented new and useful Improvements in Machines for Manufacturing Coiled-Wire Fabric, of which the following is a specification.

This invention relates to the weaving of coiled wire fabrics, such, for instance, as are used for mattresses, of the class known as double and treble lock weave, and this application is a division of Patent No. 1,431,645.

Hitherto, these two classes of weave have been effected partly by mechanical means and partly by hand, that is to say, the coiling of the wire to form each strand has been effected by a machine whilst the severing and the positioning or longitudinal movement of the last severed coil or strand and the fabric to enable the next coil or strand to be run into engagement therewith, has been effected by hand.

Now, the object of the invention is to dispense with hand labor for positioning the coils or strands after being severed and to this end we adapt machines such as are used for weaving plain coiled wire fabrics embodying coiling mechanism, severing mechanism and positioning mechanism for weaving fabrics of double and treble lock weave.

In a suitable arrangement for carrying out the invention we make use of a machine such as described in our Patent No. 1,431,645 for weaving plain coiled wire fabrics and we arrange the cam mechanism for effecting the longitudinal feed movement of the positioning rollers therein, to allow, after a coil or strand has been run into the fabric and severed, a second coil or strand, in the case of double lock weave, or a second and a third coil or strand in the case of treble lock weave, to be run into and in alignment with the said first mentioned coil before the feeding of the fabric laterally to receive another double or triple strand.

To enable the invention to be fully understood, we will describe it by reference to the accompanying drawings, in which:

Fig. 1 is a plan of a machine constructed according to the invention for manufacturing or weaving coiled wire fabrics and Fig. 2 is an elevation of a portion of the same.

Fig. 3 is a horizontal section on the line 3—3, Fig. 2.

Fig. 4 is a view of the right hand side of the machine and

Fig. 5 is a sectional view of a part of the opposite side thereof.

Fig. 6 is a rear view of the machine and

Figs. 7, 8, and 9 are respectively, vertical sections on the lines 7—7, 8—8, and 9—9, of Fig. 6, certain parts being omitted from each of these figures for the sake of clearness.

Fig. 10 is an elevation of a portion of the frame of the machine showing some of the bearings.

Fig. 11 is an enlarged section on the line 11—11, Fig. 1, illustrating clearly the positioning rollers.

Fig. 12 is an elevation showing the falling weight and lever operated thereby.

Fig. 13 is a section of a modified form of positioning roller.

Fig. 14 is a sectional view of one of the friction clutches.

Fig. 15 is a development of the surface of the drum carrying the cams for effecting the lateral and longitudinal movement of the feed rollers, the operation of the coiling gear and the operation of the wire severing mechanism when making coiled wire fabric of double lock weave and Fig. 16 is a view similar to Fig. 15, but showing the cams used when making coiled wire fabric of treble lock weave.

Fig. 17 is a plan showing the grooved mandrel over which the coiled wire travels from the coiling mechanism, the severing or cutting mechanism, the comb for assisting to maintain the last made coils in their proper relative positions longitudinally and the positioning rollers in dotted lines, the said figure illustrating the first stage of the manufacture of double lock weave fabric.

Fig. 18 is a front elevation of the said mechanism but without the severing devices and drawn to a smaller scale than Fig. 17.

Figs. 19, 20 and 21 are somewhat similar views to Fig. 17, showing further and progressive stages in the manufacture of the double lock weave fabric.

Fig. 22 is a plan of a piece of such fabric.

Fig. 23 is a diagrammatic view illustrating the order or arrangement of the cams shown in Fig. 15, and Fig. 24 is a similar view of the order or arrangement of similar cams described in the aforesaid specification for manufacturing fabrics of plain weave.

Figures 25, 26, 27, 28:
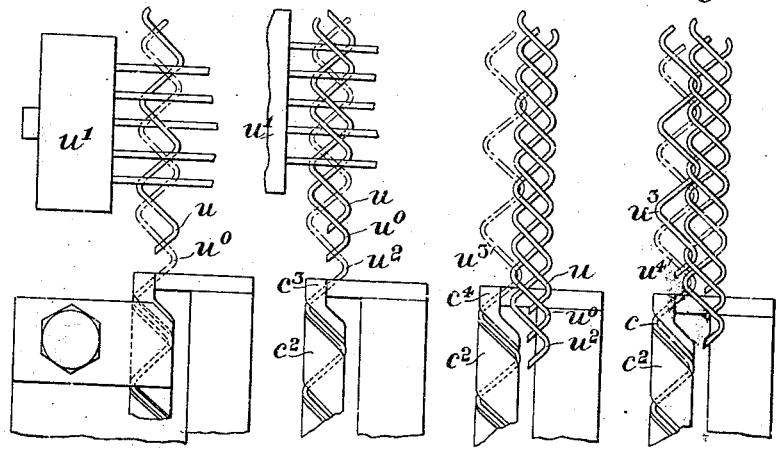

Fig. 25 is a similar view to Fig. 17, illustrating the mode of manufacturing coiled wire fabrics of treble lock weave.

Figs. 26 to 30 are somewhat similar views to Fig. 25, showing various and progressive stages in the manufacture of the said treble lock weave.

Figures 29, 30, 31:
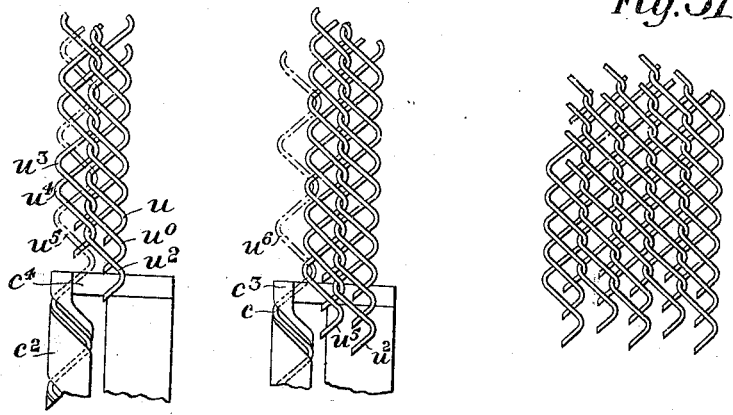

Fig. 31 is a plan of a piece of such fabric and

Figure 32:
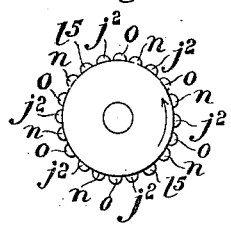

Fig. 32 is a diagrammatic view illustrating the order or arrangement of the cams shown in Fig. 16.

$a$ is the frame or base of the machine provided with three standards $a^1$, $a^2$, $a^3$. Between the standards $a^2$, $a^3$ are arranged the feed rollers for the coiling mechanism and comprising the upper plain roller $b$ and the lower grooved roller $b^1$, the peripheries of which rollers revolve nearly in contact with one another. The said rollers are geared together so as to run at equal speeds by means of rings of spur teeth $b^2$. $c$ is the wire to be coiled and which is drawn from a spool in the usual way and may be in one, two or more plies, the said wire or wires lying in the groove $b^4$ in the roller $b^1$, and being gripped therein by pressure of the top roller $b$ thereon, and fed into the coiling die $c^1$ of usual or known form. The top roller $b$ is supported upon a shaft $d$ carried in bush bearings $e$, $e^1$ in the standards $a^2$, $a^3$ respectively. The bush $e$ is held in position in a recess $e^2$ in the standard $a^2$ and is pressed upon its upper part by a rubber block $e^3$ to which pressure can be imparted by set screws $e^4$ through the medium of a plate $e^5$ the said screws passing through the cap $e^0$. The bearing $e^1$ is supported in a recess $e^6$ in the standard $a^3$ and can be adjusted therein through the medium of set screws $e^7$ to impart the necessary pressure to the wire $c$ (or wires). A rubber block $e^8$ is advantageously interposed between the bush $e^1$ and a covering cap $e^9$ connected to the upper part of the standard $a^3$. The roller $b^1$ is supported on a shaft $f$ arranged in bearings in the standards $a^1$, $a^2$ and designed to be rotated to effect the rotation of the rollers $b$, $b^1$ from a shaft $f^1$ supported in bearings at the top of the said standards $a^1$, $a^2$ through the medium of a train of three gear wheels $f$. The said shaft $f^1$ has connected thereto one member $f^3$ of a friction clutch, the other member $f^4$ of which is loose on the said shaft and is in the form of a pulley which is constantly rotated by a suitable belt and when pressed into contact with the member $f^3$ effects the rotation of the rollers $b$, $b^1$. The members $f^2$, $f^4$ constitute the main clutch and have arranged between them a spring $f^5$.

$g$ is the controlling lever pivoted at one end by a shaft $g^1$ to the standard $a^1$, the said shaft being provided with arms $g^2$ which engage holes in lugs $g^3$ on a disc $g^4$ mounted loosely on the shaft $f^1$ and bearing against the pulley $f^4$, so that, when the said lever $g$ is rocked in one direction on its pivot, the member $f^4$ of the main clutch will be pressed into contact with the other member $f^2$. $g^5$ is the catch for holding the controlling lever $g$ in position after it has effected the pressing together of the two members of the main clutch, the said catch, which is pivoted at $g^6$ to the standard $a^2$, engaging, under the pull of a spring $g^0$, a hooked projection $g^7$ on the lever $g$, the said lever being held in this position against the pull of a spring $g^8$. The coiling gear is designed to be intermittently driven and to enable this to be effected, we provide means for disengaging the catch $g^5$ from the hook projection $g^7$ on the controlling lever $g$. For this purpose, we provide the horizontal bar $h$ slidably supported in a guide $h^1$ carried on the standards $a^1$, $a^2$ and having rack teeth $h^2$ in mesh with a pinion $h^3$, as shown clearly in Fig. 3. This pinion is rotated by a clutch, preferably in the form of a split tapered sleeve $h^4$, Figs. 3, 5 and 14, fitted within a central hole in the said pinion and formed on, or attached to, a gear wheel $h^5$, the latter meshing with a worm $h^6$ on the shaft $f$ and being carried on a bearing in a pillar $h^0$. Within the split sleeve $h^4$ is fitted a taper pin $h^7$ designed to be moved within the sleeve $h^4$ so as to expand the latter into tight contact with the hole in the pinion $h^3$, this movement being imparted by a downward extension $h^8$ on the controlling lever $g$. When the pressure of the said extension is removed from the pin $h^7$, the sleeve $h^4$ will contract and so become disengaged from the pinion $h^3$.

The rack bar $h$ is moved by the pinion $h^3$ to disengage the catch $g^5$ against the pull of a weight $h^9$ through the medium of a cord $h^{10}$ running over a pulley $h^{11}$. $h^{12}$ is a set screw for determining the starting position of the rack bar $h$ so that the duration of the movement of the said bar $h$ to strike the catch $g^5$, can be varied according to the time at which it is required to run the coiling gear and consequently the length of coil or strand produced.

The coiled wire is fed from the die $c^1$ around the grooved mandrel $c^2$ in the known manner, the end of the said mandrel forming one surface $c^3$ of a pair of cutting surfaces, the other one $c^4$ of which is movable and supported and carried by a lever $c^5$ actuated as hereinafter described. This lever is pivoted at $c^6$ to a bracket $c^7$ carried on the frame $a$, the said bracket also serving for supporting the mandrel $c^2$.

$i$, $i^1$ are the positioning rollers arranged horizontally, one above the other, with a space between them to grip each row of coils in turn of the fabric being made, the said rollers being located with their axes parallel to the axis of the coiled wire lying between the mandrel $c^2$ and the coiling die $c^1$, but out of line therewith and just beyond the rear end of the mandrel $c^2$, as indicated in Fig. 1, so that, say, after three rows of coils have been issued from said mandrel in succession and linked with one another, the third row, as indicated clearly in Fig. 11, will be located between the positioning rollers $i$, $i^1$, so that the latter can, by rotating in the direction of the arrows, feed the fabric to receive fresh coils in turn, as hereinafter described. The coils as they issue from the mandrel $c^2$ run on to the table A, the upper surface of which is level with the upper surface of the lower roller $i$.

The rollers $i$, $i^1$ are provided with the ribs $i^2$ arranged longitudinally so as to grip the coils as indicated in Fig. 11. Fig. 13 is a cross section of one of the positioning rollers in which fins $i^3$ are substituted for the ribs $i^2$. $i^4$, $i^5$ are the housings in which the rollers $i$, $i^1$ are carried on centres $i^6$, these housings being hinged together as indicated at $i^7$, Fig. 9, and drawn towards one another by springs $i^8$ attached at one end to lugs on the housing $i^5$ and at the other end to the base $a$. $j$ is the slide upon which the housings carrying the rollers $i$, $i^1$ are mounted so that longitudinal movement can be imparted to the said rollers for positioning the fabric so that the new or running coil is engaged with the coils already made at the proper point according to the class of fabric being made. This slide works in guides $j^1$ on the frame $a$ and is actuated from a cam $j^2$ in the form of a rib on a drum $j^3$ through the medium of a lever $j^4$ adjustably pivoted to the frame $a$ at $j^5$. This cam is carried on a shaft $k$ mounted in bearings $k^1$ on the frame $a$ and driven by a worm wheel $k^2$ on the shaft $k$ from a worm $k^3$, carried on a shaft $k^4$ mounted in bearings in the standards $a^1$, $a^2$. This shaft $k^4$ carries a friction wheel $k^5$ designed to be driven from the pulley $f^4$ through the medium of the friction roller $k^6$, which is brought into contact with both the belt on the pulley $f^4$ and the wheel $k^5$ by a pair of toggle levers $k^7$, $k^8$. These levers are slidably supported on fulcrum pins $k^9$ on the standard $a^2$ and joined together at $k^{10}$, the outer end of the lever $k^7$ carrying the roller $k^6$, whilst the outer end of the lever $k^8$ is pivoted to the controlling lever $g$. It will thus be seen that when the controlling lever is moved upwardly it disengages the main clutch members $f^3$ and $f^4$ and at the same time moves the friction roller $k^6$ into contact with the driving belt $f^0$ surrounding the pulley $f^4$ and thus drives the wheel $k^5$ and consequently rotates the cam drum $j^3$.

For rotating the positioning rollers $i$, $i^1$ the lower roller $i$ is provided at its front end with ratchet teeth $l$, as shown clearly in Fig. 11, corresponding in number with the rib $i^2$ thereon, so that the said roller can be fed or rotated one rib at a time, in order to displace the coiled fabric laterally, one coil at a time. $l^1$ is a pawl engaging with the said ratchet teeth and carried on a short lever $l^2$ pivoted on one of the centres carrying the roller $i$, the said lever being oscillated by a pin $l^3$ on a bell crank lever $l^4$ actuated by a cam $l^5$ carried on the drum $j^3$, the said bell crank lever being fulcrumed on the frame $a$ by a shaft $l^6$ which also carries an arm $l^7$. This arm $l^7$, through the medium of a pin $l^8$, rocks another arm $m$ to impart movement to a bar $m^1$ resting on the table A which bar forms a guide for the running coil and assists the rollers $i$, $i^1$ to feed the fabric after each coil inserted. This feeding movement is effected simultaneously with the feed movement of the said rollers $i$, $i^1$ through the movement of the said arms $l^7$, $m$ from the bell crank lever $l^4$, the arm $m$ being fulcrumed on a shaft $m^2$ carrying upstanding arms $m^3$ which bear against one side of the bar $m^1$ and actuate the latter to feed the fabric against the pull of tension springs $m^4$.

$n$ is the cam for effecting the severing of the coils, after being run on to the table A by means of the cutting surfaces $c^3$, $c^4$. This cam actuates a lever $n^1$, Fig. 8, fulcrumed at $n^2$ to the bracket $c^7$ and bearing upon a lug $n^3$ on an upright rod $n^4$ pivoted at $n^5$ to the lever $c^5$. The rod $n^4$ slides and is guided in a hole in the frame $a$ and is pressed upwardly in contact with the lever $n^1$ by a spring $n^6$.

In order to keep the running coil in contact with the bar $m^1$ we employ an electromagnet $m^5$, the faces of the pole pieces $m^6$ of which are level with the guide surface of the said bar $m^1$. This magnet is energised, each time a coil is run into the fabric, by a switch in the form of a drum $m^7$ carried upon the shaft $k$ and having a pair of contacts $m^8$ with which a brush $m^9$ in electrical connection with one terminal of the magnet makes contact twice in each revolution of the shaft $k$ when making fabric of double lock weave. These contacts $m^8$ are in permanent electrical connection by a brush $m^{10}$ with one pole of a source of current the other pole of which is in electrical connection with the other terminal of the magnet.

$o$ is a cam for automatically effecting the movement of the controlling lever $q$ to throw in the main clutch to drive the coiling gear and stop the rotation of the cam shaft $k$. This cam actuates a lever $o^1$ fulcrumed at $o^2$ to a lug on the frame $a$ and connected at its upper end by a rod $o^3$ to a lever $o^4$ pivoted at $o^0$ to the standard $a^3$, the cam $o$ moving the rod $o^3$ against the pressure of a spring $o^5$ located between the end of the said rod $o^3$ and a bracket $o^6$ attached to the frame $a$. This lever $o^4$, until actuated by the cam $o$, presses against the taper pin $p$ of a clutch mechanism similar to that described in connection with the pinion $h^3$. This pin $p$ is located in a hole formed in one end of the shaft $f$, the said end being split and formed taper to fit the pin $p$ and has fitted on its outer surface a loose sleeve $p^1$ to which is attached a cord $p^2$ carrying at its lower end a weight $p^3$, shown clearly in Fig. 12. Below the weight $p^3$ is arranged a lever $p^4$ hinged to the floor $p^5$, or to a suitable part of the machine, and connected by a cord or wire $p^6$ to the outer end of the controlling lever $q$. The pressure of the spring $o^5$ causes the pin $p$ to expand the split end of the shaft $f$ to grip the sleeve $p^1$, and, assuming that the cord $p^2$ is wound upon the sleeve, as indicated in the drawings, and the cam $o$ be caused to actuate the lever $o^4$ to relieve the pressure on the pin $p$, the friction between the split end of the shaft $f$ and the sleeve $p^1$ will consequently be relieved, and allow the latter, under the influence of the weight $p^3$, to be revolved so that the weight will be lowered and strike the lever $p^4$, which, through the medium of the cord $p^6$, will lower the controlling lever $g$ against the pull of the spring $g^8$ and connect the members of the main clutch so that motion is imparted to the coiling gear, the said lever $g$ being held in the lowered position by the engagement of the catch $g^5$ with the hooked extension $g^7$.

$q$ is the lever for starting the machine, which lever is of bell crank form pivoted at $q^1$ to the upper part of the standard $a^2$ and in the stopped position bears against the controlling lever $g$ and holds it in an intermediate position, as indicated in Fig. 5, in which the roller $k^6$ is out of contact with the belt $f^0$. The said lever $q$ is provided with a stop pin $q^2$ which, in the said stopped position, holds the catch $g^5$ in such a position that it cannot engage with the hooked extension $g^7$. By moving the said lever $q$ to the dotted line position in the said Fig. 5, it will be seen that the controlling lever $g$ will be free to rise under the pull of its spring $g^3$, so that the toggle levers $k^7$, $k^8$ will be moved to cause the friction roller $k^6$ to engage with the pulley belt $f^0$ and wheel $k^5$, thereby effecting the rotation of the shaft $k$ and causing the cam $o$ to move the lever $o^4$ to release the weight $p^3$ and through the medium of the lever $p^4$ and cord $p^6$ to lower the controlling lever $g$ into engagement with the catch $g^5$. The shaft $k$ will thus cease rotating on the disengagement of the roller $k^6$ with the wheel $k^5$ and belt $f^0$, and the pulley $f^4$ will be caused to engage with the member $f^3$ so that the coiling gear will be rotated to deliver a running coil on to the table A.

The starting lever $q$ is held in the dotted lined position by a pivoted latch $r$ against the pull of a tension spring $q^3$, the said latch having a notch $r^1$ in which engages a projection $r^2$ on the starting lever $q$, so that it is necessary, when stopping the machine, that the latch $r$ be lifted in order that the starting lever $q$ may be drawn to the full line position under the influence of the spring $q^3$. This stopping operation is also automatically effected if the wire being coiled should issue from the coiling mechanism deformed, and for this purpose we employ a solenoid $s$, the core $s^1$ of which is connected by a rod $s^2$ to the latch $r$ and a stud $s^3$ is mounted on the standard $a^2$ but insulated therefrom and which is in electrical connection with one pole of a source of current as indicated in Fig. 5. The starting lever $q$ is provided with an insulated contact piece which, when the said lever is moved to the dotted line position, makes contact with the said stud. In front of the coiling die $c^1$ is arranged a shield in the form of a semicircular piece of sheet metal $c^x$ with which the deformed wire is designed to contact and which is carried on but insulated from the standard $a^2$ and in electrical connection by a wire $s^4$ with the insulated contact on the lever $q$. One terminal of the solenoid is connected to the other pole of the source of current whilst the other terminal is connected to the frame, as indicated. Assuming the machine to be running, the lever $q$ being in the dotted line position, if the wire being coiled should become deformed so that it touches the shield $c^x$, current will circulate through the stud $s^3$, the contact on the lever $q$, the wire $s^4$, the said shield, the coiling die $c^1$ and the frame $a$ to the solenoid $s$ so that the core $s^1$ will be sucked into the latter and lift the lever $r$.

The cams $o$, $l^5$, $j^2$, $n$ indicate in the development, Fig. 15, and diagrammatically in the order of working in Fig. 23 employed for making a fabric of double lock weave and effecting, respectively, the operation of the coiling gear, the lateral feed or rotation of the positioning rollers $i$, $i^1$, the longitudinal movement of the said rollers and the operation of the movable cutting member $c^4$ relatively to the fixed cutting member to sever the coils or strands, are similar to those described in our said Patent No. 1,431,645 for making coiled wire fabric of plain weave and the order of working of which cams for this latter purpose is illustrated in Fig. 24. On comparison of these two Figures 23 and 24 it will be seen that the order of the cams for making the double lock weave and the plain weave is the same except that one of the cams $l^5$ shown in Fig. 24 for effecting the lateral feed movement of the rollers $i$, $i^1$ is omitted in Fig. 23, owing to the fact that two coils have to be run in in succession in the same line, so that after placing, say, the first coil in position it is not necessary to rotate or feed the rollers $i$, $i^1$, but only to position or move them backward or away from the severing device to receive the second coil, the feeding of the fabric then taking place. Another coil is then run in and the fabric positioned forwards to receive the next pair of coils and so on.

In the operation for the production of a one ply double lock weave fabric, assume that two double coils $t$, $t^1$ and $t^2$, $t^3$, Fig. 17, have been successively delivered by the coiling mechanism, the requisite positioning being effected by hand and assume the said two coils to have been moved laterally so that the positioning rollers $i$, $i^1$ engage with the coil $t$, $t^1$ in the manner indicated in Fig. 18 whereby the said coils $t$, $t^1$ and $t^2$, $t^3$ are secured against longitudinal movement while the next coil is being run in. Assume now that the machine is running and that the cam $j^2$ on the left hand side of Fig. 23 has operated to position the coils $t$, $t^1$ and $t^2$, $t^3$ forward with respect to the cutting mechanism. The coiling gear will then be brought into operation by the cam $o$ and the first coil $t^4$ of the third double coil will be run in and engage with the coil $t^3$ and the cam $n$ will actuate the cutting member $c^4$ to sever the said coil $t^4$. The second cam $j^2$ will then come into operation and effect a backward movement of the fabric by means of the rollers $i$, $i^1$ so as to bring the coil $t^4$ into the position indicated in Fig. 17. The coiling gear will then again come into operation by the action of the second cam $o$ and the second coil $t^5$ of the third double coil run in as indicated by the dotted lines in the said figure and be severed by the action of the second cam $n$. The cam $l^5$ will then come into operation and cause the rotation of the rollers $i$, $i^1$ to feed the fabric laterally. The cams will then again act as above described, the first mentioned cam $j^2$ again positioning the fabric forwardly into the position indicated in Fig. 19, the first coil $t^6$ of the fourth double coil being then run in to engage the coil $t^5$ as indicated by the dotted lines, after which the fabric is positioned backwardly to receive the second coil $t^7$ which engages with the coil $t^4$ as shown in Fig. 20.

Fig. 21 shows the fabric again moved laterally and forwardly to receive the first coil of the next double coil. Fig. 22 shows a piece of the finished fabric of double lock weave.

In the manufacture of the treble lock weave illustrated in Figs. 25 to 32 the cams $n$, $l^5$, $j^2$ and $o$ are arranged as indicated in Fig. 16 in the said Fig. 32 commencing at the topmost cam $o$ in the said latter figure so as to run in three aligning coils for each strand, the first two coils $u$, $u^0$ being shown in Fig. 25 whilst the third coil $u^2$ is shown in Fig. 26, the fabric being positioned backwards to receive the second and third coils. The cam $l^5$ then effects the lateral feed of the fabric by rotation of the rollers $i$, $i^1$ and the next cam $j^2$ then positions the fabric forwards to receive the first coil $u^2$, Fig. 11, which engages with the coil $u^0$. The fabric is then again positioned backwards twice to receive the second and third coils $u^4$, $u^5$, respectively, of the next strand, as indicated in Figs. 28 and 29, and then fed laterally by the second cam $l^5$ and forwardly by the succeeding cam $j^2$, thus completing the cycle of operations of the cams indicated in Fig. 32. The coils just described will then be in position indicated in Fig. 30, so that the operation of the topmost cam $o$ in Fig. 32 will result in the first coil $u^6$ of the next of third strand as indicated in Fig. 30. Fig. 31 shows a piece of the finished fabric of treble lock weave.

It is to be understood that as in the manufacture of treble lock weave as described six coils are run in to the fabric during one rotation of the shaft $k$ it will be necessary to provide six contacts $m^8$ on the drum $m^7$. To assist in maintaining the coils in their proper relative positions longitudinally, the first five coils, say, are pierced by the teeth $u$ of a horizontal comb connected by a frame $u^2$ to the lower housing $i^4$.

In the drawings it will be noticed that the fabrics therein shown are made of single ply, that is of one wire only for each coil, but it is to be understood that two or more wires can be employed for each coil.

By the employment of the positioning rollers we are enabled to produce fabrics the coils of which are of very small diameter and pitch as compared with fabrics hitherto made.

What we claim and desire to secure by Letters Patent is:—

1. A machine for manufacturing coiled wire fabric including wire coiling means, means for actuating the coiling means intermittently, whereby the coiling means coils a length of wire and then halts its operation, means for severing each coil, intermittently operating means for actuating the severing means, positioning mechanism designed to grip the fabric and hold the same in a position to permit the coiling means to intertwist a coil into the fabric, and controlling means for said mechanism adapted to cause said mechanism to hold one edge of the fabric adjacent to the outlet end of the coiling means to permit a coil to be run into the fabric; to then shift the fabric toward the coiling means slightly to permit a second coil to be intertwisted with the last mentioned coil and with the fabric; and to then move the positioning means laterally and away from the coiling means to permit the latter to insert a coil into the previously intertwisted coils.

2. A machine for manufacturing coiled wire fabric including wire coiling means, means for intermittently actuating said coiling means, intermittently actuating severing means adapted to cut the wire between each actuation of the coiling means, positioning mechanism adapted to grip the fabric and to hold one edge of the same in position to receive coils from the coiling mechanism, and control means for the positioning mechanism arranged to intermittently move one edge of the fabric step by step toward the coiling means without moving the fabric laterally; and to then move the fabric laterally and away from the coiling means.

3. A machine for manufacturing coiled wire fabric comprising in combination, positioning mechanism adapted to grip the fabric and hold an unfinished edge of the same in a position to receive a coil of wire which is to be intertwisted with the fabric, wire coiling means associated with the positioning mechanism and arranged to twist wire into helical form and feed the same into the edge of the fabric held by the positioning means, intermittently actuated shears for cutting the wire after a coil of the latter has been intertwisted with the coils of the fabric, and control elements actuating the positioning mechanism for causing the latter to intermittently and progressively feed the fabric toward the coiling means a plurality of times without shifting the fabric laterally and to then shift the fabric laterally and away from the coiling means.

4. A machine as claimed in claim 3 in which the control elements include cams.

5. A machine as claimed in claim 3 in which the control elements function to successively move the fabric toward the coiling means for a plurality of steps and without moving the fabric laterally; to then move the fabric laterally and away from the coiling means; and to again move the fabric toward the coiling means for a plurality of steps.

HENRY ARTHUR FRASER.
PETER FREDERICK CRIGHTON.